Aug. 11, 1931.   J. F. DE VILLARD   1,818,309
AEROPLANE
Filed May 14, 1930
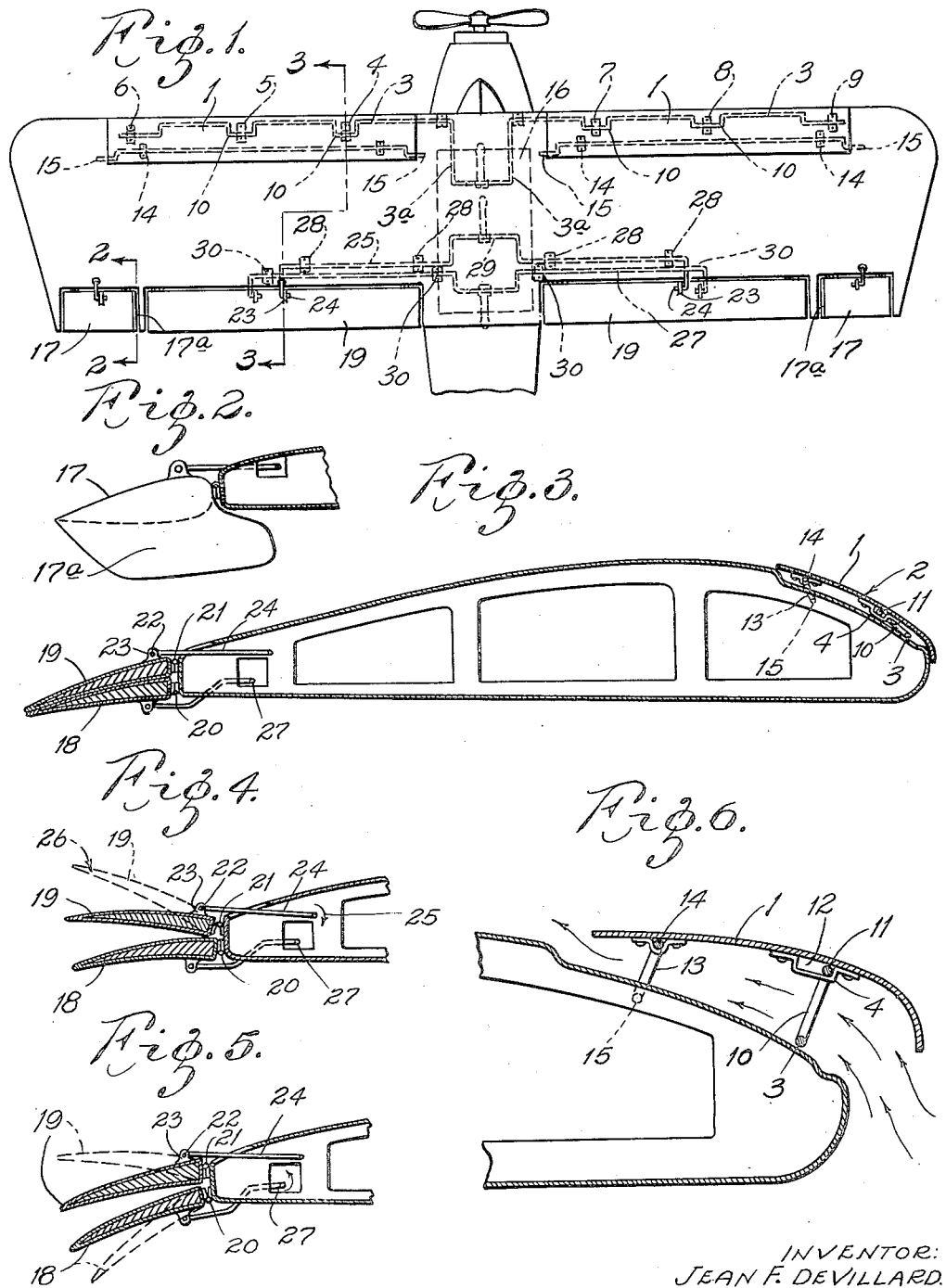
INVENTOR:
JEAN F. DEVILLARD.
ATTORNEY.

Patented Aug. 11, 1931

1,818,309

UNITED STATES PATENT OFFICE

JEAN F. DE VILLARD, OF EAST ST. LOUIS, ILLINOIS, ASSIGNOR OF ONE-TENTH TO ABRAHAM ROGUL, OF EAST ST. LOUIS, ILLINOIS

AEROPLANE

Application filed May 14, 1930. Serial No. 452,365.

This invention relates to improvements in aeroplanes and more particularly to improvements in the wings of aeroplanes.

The primary object of this invention is the production of an aeroplane of maximum stability and safety, capable of taking off and landing in small areas, and capable of taking off at a high angle and descending at low speed.

Another object of this invention is to provide an aeroplane wing structure that will cause the plane in normal flight to assume and maintain a position level with the horizon and that when in stalled position will not go into a tail spin, and which will not readily side slip; also, which will reduce to a minimum the hazard of tail spinning.

The manner in which these desirable qualities are brought about, together with further objects and advantages of this invention will be more fully explained in the specification, claims and drawings, in which:

Fig. 1 is a plan view of an aeroplane wing to which my invention has been applied.

Fig. 2 is a section of a wing and aileron taken along the line 2—2 in Fig. 1.

Fig. 3 is a section along the line 3—3 in Fig. 1.

Fig. 4 is a section of the trailing edge of a wing to which is attached a bifolded flap.

Fig. 5 is a view similar to Fig. 4, the dotted lines showing the limit of movement of the flap.

Fig. 6 is a section through the leading edge of an aeroplane wing, showing the front flap in open position.

From experience gained during many years as a professional pilot, I have learned the feel of a ship in the air when in normal flight, when in a stall, when side slipping, when tail spinning and when taking off and landing. In all of these experiences I have been made aware that the slightest change in the contour of the wings inevitably produces a marked effect upon the control and behavior of the ship; hence, in this invention, I have devised means and mechanisms that will give a plane more stability in the air, will reduce its landing speed, increase the angle of take off and reduce the hazard of nose dives, tail spins and side slipping.

To bring about these results, my preferred method of construction, as shown in the drawings, is as follows.

In Fig. 3 I have illustrated a cross section of an aeroplane wing embodying my invention in position for normal flight, comprising a movable flap 1, having a smooth curvilinear upper surface adapted when in closed position, as indicated in Fig. 1, at 2, to maintain the normal contour of the wing.

The mechanism for moving the flap 1 consists of a rotatable crankshaft 3 journalled in the front edge of the wing at 4, 5 and 6, on one side, and identical structure on the opposite side journalled at 7, 8 and 9. At each journal a crank 10 is formed. At each crank, a crankshaft 11 is disposed in a slot 12, best shown in Fig. 6, so that when the crankshaft 3 is rotated clockwise the crankpin moves to the front end of the slot and moves the flap 1 to its maximum limit. When rotated anti-clockwise, the crankpin moves to the opposite end of the slot and lowers the flap 1, as shown in Fig. 3.

The rear end of the flap 1 is pivotally mounted on the front end of the wing by a link member 13 journalled in the flap at 14 and in the wing at 15.

The crankshaft 3 is rotated by an enlarged crank having relatively long jaws 15a, which is integral with the crankshaft and projects into the cockpit 16. Lever means could, of course, be provided for rotating the crank projecting into the cockpit, which said means are neither shown nor claimed, but may be of any suitable type.

It is evident that when the front flap is in the position shown in Fig. 6, should the machine be brought to a stall, the air currents flowing as indicated by the arrows would effectively prevent the machine from nose diving.

The ailerons 16 are hingedly attached to the trailing edge of the outer end of the wing in the normal manner and are controlled in the normal way, my improvement consisting of a downwardly projecting, plain, flat fin member 17 rigidly attached at a right angle to the aileron, the natural effect of which is to retard the transverse movement of the plane thereby retarding side slipping.

Between the ailerons and the fuselage, two identical flaps 18 and 19 are hingedly attached to the trailing edge of the wing may be moved upwardly or downwardly either simultaneously or independently of each other. In normal flight, the two flaps lie close together, as shown in Fig. 3. When maneuvering the plane the flaps 18 and 19 may be moved upward and downwardly independently of each other, as shown in Fig. 6, the limit of upward movement of flap 19, being shown in dotted lines, and the downward movement of flap 18 is also shown in dotted lines.

The flap 18 is rigidly attached to the trailing edge of the wing at 20, and the flap 19 is hingedly attached to the trailing edge of the wing at 21.

The crankpin 22 is journalled at 23 to the upper portion of the upper flap. The crankarm 24 moves upwardly when the crank is rotated clockwise, as shown by the arrow 25 in Fig. 4, causing the flap 19 to move up to the position shown by the dotted lines 26. In like manner, the flap 18 is actuated in the opposite direction when the crankshaft 27 is rotated anti-clockwise.

The crankshaft 25 is journalled at 28 and rotated by means of the crank 29 projecting into the cockpit 16, and may be coupled to suitable levers or to the joy stick, in a manner neither shown nor claimed. The crankshaft 27 is likewise journalled at 30 and controlled in the same manner as crankshaft 25.

Having fully described my invention, what I claim as new and useful and desire to protect by Letters Patent is:

1. An improvement in aeroplanes of the class described, comprising a plurality of movable members disposed upon the top of the leading edge of an aeroplane wing, an aeroplane wing longitudinally recessed upon the top side of its leading edge and parallel thereto adapted to receive said movable members, so that when said movable members are closed into said recesses the top side of said wing will present a smooth unbroken curvilinear surface, means for moving said movable members outwardly and forwardly, means for moving said movable members inwardly and backwardly.

2. An improvement in aeroplanes of the class described, comprising a plurality of movable flaps pivotally joined to the leading edge of an aeroplane wing, mechanism for controlling the movement of said flaps, a plurality of bifold flaps hingedly joined to the trailing edge of an aeroplane wing, means for moving said bifold flaps in unison in one direction, means for moving said bifold flaps in unison in opposition directions, means for moving said flaps independently of each other in two directions.

3. An improvement in aeroplanes of the class described, comprising a plurality of movable flaps flexibly joined to the leading edge of an aeroplane wing, means for controlling the movement of said flaps, a plurality of movable flaps rotatably joined to the trailing edge of an aeroplane wing between the ailerons and fuselage of an aeroplane, ailerons having a plain, flat member transversely joined to them at right angles thereto and depending therefrom.

4. An improvement in aeroplanes comprising a wing longitudinally recessed on the top side of its leading edge parallel thereto and adapted to receive a movable flap, a movable flap having a plain, smooth, curvilinear exterior surface adapted to fit into said recess and complete the normal curvilinear, plane surface of the top of said recessed wing, means for moving said flap into and out of said recess, a plurality of flaps disposed in pairs one above the other and hingedly joined to the trailing edges of the wing of an aeroplane, means for operating and controlling said last-named flaps, ailerons having downwardly projecting, smooth-surfaced members transversely joined to said ailerons, said members having their exposed edges curvilinear.

In witness whereof I have hereunto affixed my signature this 6th day of May, 1930.

JEAN F. DE VILLARD.